Feb. 12, 1935.  S. A. STAEGE  1,991,066
REGULATING SYSTEM
Filed Sept. 27, 1933
Fig.1.
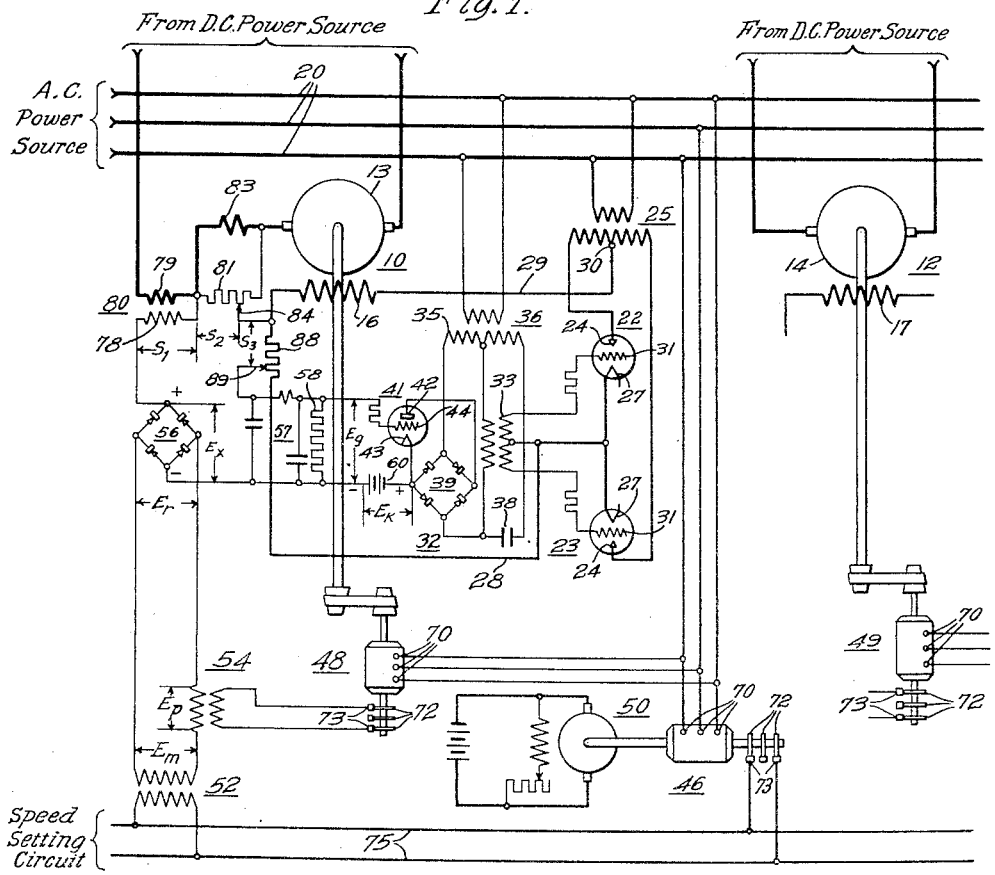
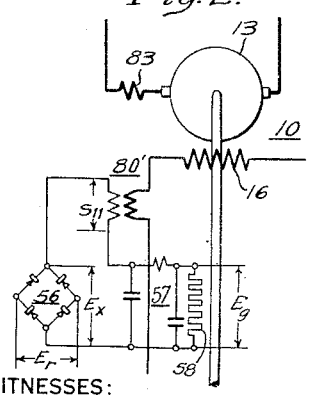
Fig.2.
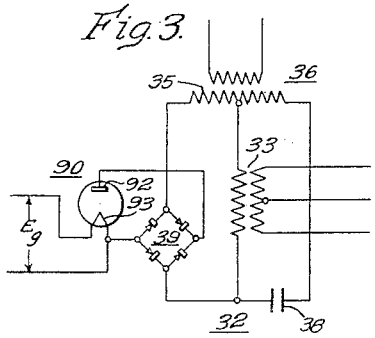
Fig.3.
WITNESSES:
C. J. Weller.
Wm. C. Groome
INVENTOR
Stephen A. Staege.
BY
Franklin E. Hardy
ATTORNEY Patented Feb. 12, 1935

1,991,066

UNITED STATES PATENT OFFICE 1,991,066

REGULATING SYSTEM

Stephen A. Staege, Pittsburgh, Pa., assignor to Westinghouse Electric & Manufacturing Company, East Pittsburgh, Pa., a corporation of Pennsylvania Application September 27, 1933, Serial No. 691,160

8 Claims. (Cl. 172—293)

My invention relates to regulating systems and it has particular relation to stabilizing means for regulating systems of the type adapted to maintain predetermined speed relations among a plurality of electrical machines.

In certain situations where a plurality of separate driving motors are utilized to propel different portions of a common equipment, such, for example, as in the art of paper making, it is essential that the speeds of the several motors be very accurately maintained at predeterminedly related values. In my copending application Serial No. 691,159 filed September 27, 1933, I have shown and described a regulating system especially adapted for service of the above-described type. In that particular system variations from a desired value in the speed of each regulated motor are caused to effect changes in the magnitude of a direct-current control potential which is applied to electronic tube speed-adjusting means. The present invention is directed to improved anti-hunting and compensating means for systems of the described and other equivalent types.

One object of my invention is to provide, in a regulating system of the type under consideration, anti-hunting means which act to modify the electronic tube control potential in accordance with the direction and rate of change of the current acting in one of the windings of the regulated motor.

Another object of my invention is to provide means whereby changes in the loading of the regulated motor may be caused to appropriately stabilize the electronic tube speed control means.

A further object of my invention is to provide stabilizing means of the above-described type which are responsive to changes in the motor excitation.

In practicing my invention I introduce into the control circuit of the electronic tube speed adjusting means of the regulated motor, a stabilizing potential which varies in accordance with the direction and the rate of change of the current acting in one of the motor windings, and, in certain instances, additional potentials which vary with the magnitude of the motor armature current, and the magnitude of the motor exciting current. These potentials are of such character and so related that overshooting of the corrective action is prevented and appropriate compensation for changes in motor loading is effected.

My invention itself, together with additional objects and advantages thereof, will best be understood through the following description of specific embodiments when taken in conjunction with the accompanying drawing, in which:

Figure 1 is a diagrammatic view illustrating apparatus and circuits comprised by a preferred form of the stabilizing means of my invention shown as being applied to a speed regulating system for a plurality of direct-current motors.

Fig. 2 is a partial reproduction of the system of Fig. 1 showing the stability-producing transformer connected to be responsive to the current acting in the field winding instead of the motor armature winding, and Fig. 3 is a partial reproduction of the system of Fig. 1 illustrating the substitution of a two-element vacuum tube to control the phase shifting bridge circuit comprised thereby.

Referring to the drawing, the speed regulating system shown in Fig. 1 is essentially the same as that disclosed and claimed in my copending application Serial No. 691,159 before mentioned. Two of the plurality of direct-current motors whose speeds are to be regulated are illustrated generally at 10 and 12. The motors comprise armature windings 13 and 14, respectively, which are suitably connected to sources of direct-current power and field windings 16 and 17, which derive their energization from rectified current supplied from an alternating-current source designated by the conductors 20.

In the field winding circuit of motor 10 a pair of rectifier tubes 22 and 23 are provided, which tubes have anode elements 24 connected to opposite ends of the secondary winding of a transformer 25, the primary winding of which transformer is directly connected to the supply conductors 20. The cathode elements 27 of the tubes are joined together and connected, by a conductor 28, to one side of the motor field winding 16. The other side of this winding is connected, by means of a conductor 29, to the mid-tap 30 of the secondary winding of transformer 25.

Tubes 22 and 23 are of the grid-controlled gas-filled type, each being capable of conducting current from the anode element to the cathode element thereof so that in the connection shown tube 22 will pass current during alternate half cycles, while the tube 23 will similarly pass current during the remaining half cycles of the alternating-current voltage wave. The effective value of this current is controlled by changing the characteristics of the potential impressed on the tube grid elements 31.

An alternating-current grid-control potential for the tubes is supplied from a phase shifting bridge circuit 32 which comprises a grid influencing transformer 33 connected between the midpoint of the secondary winding 35 of a transformer 36 and a conductor connecting a capacitor 38 and a full-wave rectifier 39. The capacitor and rectifier are energized in series from the secondary winding of transformer 36, the primary winding of which is energized from the alternating-current circuit 20.

Rectifier tubes 22 and 23 are thus supplied with grid control potentials, the phase positions of which may be varied with respect to that of the voltage of energizing circuit 20. A slight displacement of the tube grid voltage effects conductivity early in the positive half of anode voltage, and thus causes the tubes to pass the maximum amount of current. However, as the grid voltage is further displaced, the point of conductivity in the positive half cycle is progressively delayed so that as the displacement approaches 180° the effective current passed by the tubes may be reduced to zero.

The amount of phase shift between the voltage of transformer 33 of the grid circuit and that of the excitation supply circuit is controlled by the effective resistance of rectifier 39, which variation is effected by an electronic tube 41. This tube is preferably of the vacuum type having anode and cathode elements 42 and 43 connected with the direct-current terminals of the rectifier and a grid element 44 which is influenced by a control potential, the magnitude of which is a function of the speed of the regulated motor 10.

The conductivity of control tube 41 is varied by changing the magnitude of the potential $E_g$ impressed between the grid and cathode elements of the tube. Normally, the grid element is maintained at a small value of negative potential with respect to the cathode or filament in a manner to be more completely explained. When the negative grid bias of the tube is increased, the tube becomes less conductive and thus offers a high resistance to the flow of current therethrough with the result that the voltage drop across the rectifier 39 is raised and that across the capacitor 38 is lowered. This increases the displacement angle of the output voltage of the grid circuit which causes each of the tubes 22 and 23 to become conductive at a later time during the positive half cycle of the anode voltage. The effective current supplied to the field winding of motor 10 is reduced and the speed of the motor is accordingly increased. In a similar manner a change in the positive direction of the vacuum tube grid bias effects an increase in the current supplied to the field winding of the regulated motor which causes the motor speed to accordingly be lowered.

In the regulating system illustrated, the speeds of the regulated motors are compared with that of the master generator 46 through the utilization of suitable pilot generators 48 and 49 which are respectively driven at speeds definitely related to those of the motors. Each of these three generators is illustrated as being of the induction or alternating-current excited type, which in mechanical construction may be similar to a rotor-wound induction motor. Each machine thus comprises armature or stator windings (not shown) which terminate in terminals 70 and rotor windings (also not shown) connected to slip rings 72. The stator windings are excited from the alternating-current supply circuit 20, while the output circuits from the generators are established through brush connections 73 which cooperate with the slip rings. The normal speeds of the generators substantially differ from the synchronous values as determined by the frequency of the exciting source 20 in order that the output frequencies may be of the appreciable values suitable for regulating service.

Thus the master generator 46 is driven by any suitable means illustrated in the form of a direct-current motor 50, which is preferably of the adjustable speed variety. The output circuit of this generator energizes through a speed-setting circuit 75, the secondary winding of a transformer 52 the primary winding of which is connected in series with that of a transformer 54 which is energized from the output circuit of pilot generator 48. The voltage $E_m$ supplied from the master generator thus adds to the voltage $E_p$ supplied from the pilot generator to produce the voltage $E_r$ that is impressed upon the full-wave rectifier 56.

The output terminals of this rectifier supply a direct-current potential $E_x$ which is communicated through suitable filtering equipment 57 to a resistor 58, the voltage appearing across which is designated by $E_g$. When the phase displacement between voltages $E_m$ and $E_p$ is small, the sum $E_r$ is relatively large. However, as the voltage vector $E_p$ becomes further displaced from vector $E_m$, the sum of the two voltages is materially reduced. Consequently, the magnitude of the direct-current potential $E_x$ is a maximum when the voltage of the pilot generator is in phase with that of the master generator 46 and progressively decreases as this in-phase relation is departed from.

The grid circuit of the vacuum tube 41 is acted upon by the displacement responsive voltage $E_g$ which opposes a second voltage $E_k$ of substantially constant magnitude which may be supplied from any suitable source represented in the form of a battery 60. Normally, the magnitude of $E_g$ is slightly less than that of $E_k$, the relative polarities being as indicated in the diagram in order that grid element 44 of the vacuum tube may receive a small value of negative bias.

The excitation control equipment described for motor 10 is duplicated for motor 12, and for each additional motor the speed of which is to be determined by the frequency of the master generator voltage acting in the speed-setting circuit 75. Inasmuch as all of these control equipments are identical, a detailed showing and description of that associated with motor 10 only is here given.

As explained in the copending application before referred to, the system so operates that each of the regulated motors will be caused to run at the speed which maintains its pilot generator in synchronism with the master generator, variations in the motor speed all being kept within the range of one-half cycle of master generator voltage.

In operation of this regulating system, when the regulated motor 10 is running at the desired speed, pilot generator voltage $E_p$ lags master voltage generator $E_m$ by an angle of intermediate magnitude. The resulting summation potential $E_r$ impresses upon the grid of tube 41 a bias sufficient to render the excitation-supply tubes 22 and 23 conductive to an extent which supplies to the regulated motor a correspondingly intermediate value of excitation.

In the event of a decrease in the speed of motor 10, the angle of lag of pilot generator voltage $E_p$ increases with respect to voltage $E_m$. This decreases voltages $E_r$, $E_x$ and $E_g$ and thereby effects an increase in the negative bias voltage applied to the vacuum tube 41. As has been pointed out, such a bias change in the negative direction lowers the conductivity of tubes 22 and 23, and because of the resulting decrease of the motor excitation the motor speed rises.

In a similar manner, a rise above the desired value of the speed of motor 10 reduces the amount of displacement between pilot and master generator voltages $E_p$ and $E_m$. The resulting increase in voltages $E_x$ and $E_g$ lowers the value of negative bias impressed upon the vacuum tube 41. This change of bias in the positive direction increases the excitation of motor 10 and causes the speed to be reduced.

In order to improve the stability of operation of the regulating system just described, the anti-hunting means of the present invention are applied thereto. These means provide for the introduction of three stabilizing potentials $S_1$, $S_2$ and $S_3$, either individually or jointly, as shown, into the grid control circuit of vacuum tube 41. As shown, these potentials are introduced intermediate the rectifier 56 and the filtering equipment 57 in a manner that the potential $E_g$ appearing across resistor 58 will have a value differing from the effective value of the rectifier output voltage $E_x$ by the sum of the stabilizing components named. It will be understood, however, that these stabilizing voltages can, if desired, be introduced into the grid control circuits at other points, such, for example, as between the filtering equipment 57 and the tube 41 or even in the alternating-current energizing circuit of rectifier 56.

Considering first the stabilizing or anti-hunting potential $S_1$, this is supplied from the secondary winding 78 of a transformer 80, the primary winding 79 of which is shown in Fig. 1 as being directly acted upon by the energizing current supplied to the armature winding 13 of the regulated motor 10. As long as this energizing current remains unchanged or at constant magnitude, the stabilizing potential $S_1$ will be zero. However, when the armature current rises there will be induced, in the secondary winding 78 of the transformer a voltage having one polarity, while when the armature winding current of the motor decreases the polarity of this induced voltage will be reversed. The magnitude, of course, depends upon the rate of change of motor armature current. It will thus be seen that the component $S_1$ will vary in accordance with the direction and rate of change of motor armature current and will, therefore, provide a most desirable form of stabilizing influence for the associated regulating system.

For example, as the rectifier output voltage $E_x$ is reduced in magnitude, tending to change the grid bias of vacuum tube 41 in the negative direction to thereby reduce the motor excitation and raise the motor speed, the amount of current which the motor armature winding 13 draws from its supply source will, as a result, be raised and will cause to be induced in the secondary winding 78 of the transformer a direct-current voltage which adds to $E_x$, and thus prevents voltage $E_g$ from decreasing as fast as does voltage $E_x$. This, of course, retards the reduction of motor excitation in such a manner that overshooting of the speed corrective action is effectively prevented. As the rate of rise of motor armature current tapers off towards the new stabilized value, the magnitude of this anti-hunting component $S_1$ will decrease to zero, eventually allowing voltage $E_g$, which influences the tube 41, to assume a value directly determined by voltage $E_x$.

Similarly, upon the occasion of an increase in the motor speed which causes voltage $E_x$ to be raised to change the bias of tube 41 in the positive direction and thereby raise the motor excitation and lower the speed, the energizing current drawn by motor armature winding 13 will appreciably decrease and cause to be induced in the secondary winding 78 of the anti-hunting transformer a potential of polarity which subtracts from voltage $E_x$ and thereby prevents voltage $E_g$ from being raised in direct proportion. This acts to arrest, in the same manner as that explained, the corrective action before overshooting thereof can take place. As the armature winding current of the motor approaches the new stabilized value, the anti-hunting component $S_1$ will correspondingly be reduced to zero and thereby allow voltage $E_g$ to assume a value directly determined by voltage $E_x$.

Instead of being acted upon by the armature winding current of the motor, the stability-producing transformer may be connected to be energized by the motor exciting current as shown at 80' in Fig. 2. The output or anti-hunting potential $S_{11}$ supplied thereby will now vary in accordance with the direction and rate of change of the current acting in field winding 16 and function in a manner comparable to that already explained in connection with Fig. 1 to stabilize the regulating actions.

In addition to the anti-hunting or stabilizing influence just described which is proportional to the direction and rate of change of the current acting in one of the windings of the regulated motor, I have found that it is sometimes desirable to provide load change compensating means which are effective at all times regardless of whether the motor winding current is or is not changing. Such means are illustrated in the system of Fig. 1 in the form of a potentiometer resistor 81 supplied with a voltage which is proportional to the absolute value of armature winding current. When the regulated motor is provided, as is motor 10 in Fig. 1, with a series field winding 83, one preferred manner of effecting such energization of the resistor 81 is to connect it in parallel with this series field winding.

Cooperating with the resistor is a tap connection 84 which may be moved along its length to adjust the magnitude of compensating voltage $S_2$ introduced in the grid control circuit of tube 41. When the tap 84 is moved to the extreme left, this component $S_2$ will be completely reduced to zero, while when moved to the right of resistor 81 the component will have its maximum value.

As the loading of regulated motor 10 increases, the current drawn by the armature winding 13 will likewise tend to be raised and the voltage drop through series field winding 83 will proportionately increase. This will raise the magnitude of component $S_2$ which is introduced into the vacuum tube grid control circuit in such a manner that it combines with voltage $E_x$ to appropriately modify voltage $E_g$ and cause the excitation supplied to the shunt field winding 16 of the motor to be lowered. This tends to increase the motor speed without requiring that the phase angle of the pilot generator 48 change with respect to the master generator 46 and hence allows the phase angle margin of the two generators to be reduced by a lesser extent than would be the case were the compensating component $S_2$ not to be effective.

In a similar manner when the loading of regulated motor 10 is decreased, the armature winding current is similarly reduced and the magnitude of component $S_2$ is proportionately lowered. This directly causes a change in voltage $E_g$ in a direction which is the reverse from the one just described which causes the motor excitation to be raised without necessitating the otherwise required change in phase displacement of the voltages of generators 48 and 46.

In addition to compensating the regulating system for changes in motor loading, the stabilizing component $S_2$ contributes to the anti-hunting action of the regulating system in that as soon as the change in motor speed is instituted, the component $S_2$ varies its magnitude in a direction to prematurely arrest this change, as has been seen.

I have likewise found that in certain instances it is desirable to utilize a third stability producing expedient which, in the system of Fig. 1, is shown in the form of a resistor 88 disposed in the energizing circuit of motor field winding 16. By means of an adjustable tap connection 89, an adjustable portion of the voltage drop appearing across this resistor, which drop is designated as $S_3$ may also be introduced into the grid control circuit of the vacuum tube 41. As in the case of component $S_2$, this third stabilizing voltage $S_3$ so combines with the major excitation adjusting voltage $E_x$ as to oppose the changes in excitation which are made.

The action of component $S_3$ being essentially the same as that of component $S_2$ explained in detail, no further explanation of it is here deemed necessary other than mention of the fact that it varies directly with the absolute magnitude of the exciting current supplied to motor field winding 16 and modifies the grid voltage applied to vacuum tube 41 in a direction to retard the changes in excitation which the tube 41 produces in the manner hereinbefore pointed out.

The regulating system of Figs. 1 and 2 with which the stabilizing means of my invention have been shown and described utilizes a three-element electronic tube 41 for the control of the phase shifting bridge circuit 32. Instead of such a three-element tube, a two element electronic device shown at 90 in Fig. 3 may instead be applied. As in the case of tube 41, the anode and cathode elements 92 and 93 of device 90 are connected with the output terminals of the rectifier 39 comprised by the phase-shifting bridge circuit.

The reluctance of tube 90 instead of being controlled by a grid element is determined by the temperature of the cathode or filament element 93, which temperature varies with the magnitude of the energizing voltage $E_g$ applied thereto. As this energizing voltage may be supplied through the same circuits as are shown in Fig. 1, no detailed showing of its source is here made. Inasmuch, however, as the heating current for the filament 93 is required to be of an appreciable magnitude, the capacity of the several elements comprised by the supply circuits for voltage $E_g$ may, in certain instances, have to be slightly increased.

Changes in the magnitude of voltage $E_g$, occasioned by shifts in the phase displacement of the voltages of master and pilot generators 46 and 48 and modified by the action of stabilizing potentials $S_1$, $S_2$ and $S_3$, effect corresponding changes in the temperature of cathode element 93 which varies the reluctance of tube 90 in a manner that the same adjustments in the excitation supplied to regulated motor 10 will at all times be effected.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In a speed-regulating system for a direct-current motor having field and armature windings, said system comprising an electronic tube for adjusting the current in one of said windings, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon said tube control circuit, the combination of means for introducing into said tube control circuit a modifying potential which varies with the current acting in one of said motor windings and which functions to stabilize the corrective actions effected by the regulating system.

2. In a speed-regulating system for a direct-current motor having field and armature windings, said system comprising electronic-tube speed-adjusting means for the motor, a control circuit for said tube means, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of means for stabilizing the corrective actions effected by said system comprising means for introducing into said control circuit a modifying potential which varies in accordance with the direction and rate of change of the current acting in one of said motor windings.

3. In a speed-regulating system for an electric motor comprising an electronic tube for adjusting the motor speed, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of a transformer having a secondary winding connected in said control circuit and a primary winding energized by the motor current, said transformer acting to introduce into said circuit a stabilizing potential which varies in accordance with the direction and rate of change of the said motor current.

4. In a speed-regulating system for a direct-current motor having field and armature windings, said system comprising an electronic tube for adjusting the current in one of said windings, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of a transformer having a secondary winding connected in said control circuit and a primary winding energized by the current acting in one of said motor windings, said transformer being thereby disposed to introduce into said tube circuit a stabilizing potential which varies in accordance with the direction and rate of change of the said motor winding current.

5. In a speed-regulating system for a direct-current motor having field and armature windings, said system comprising an electronic tube for adjusting the current in one of said windings, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of means for stabilizing the corrective actions effected by said system comprising means for introducing into said control circuit a modifying potential which varies in accordance with the magnitude of the current acting in one of said motor windings.

6. In a speed-regulating system for a direct-current motor having field and armature windings, said system comprising an electronic tube for adjusting the current in one of said windings, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of means for introducing into said control circuit a stabilizing potential which varies in accordance with the magnitude of the current acting in the motor armature winding.

7. In an speed-regulating system for a direct-current motor having field and armature windings, said system comprising an electronic tube for adjusting the current in one of said windings, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of means for introducing into said control circuit a stabilizing potential which varies in accordance with the magnitude of the current acting in the motor field winding.

8. In a speed-regulating system for a direct-current motor having field and armature windings, said system comprising an electronic tube for adjusting the current in one of said windings, a control circuit for said tube, a master circuit having acting therein an alternating-current voltage of given frequency, means for producing an alternating-current voltage having a frequency proportional to the speed of the motor, means for combining said two voltages, and means for controllably impressing the resulting summation voltage upon the said control circuit, the combination of means for introducing into said control circuit a stabilizing potential which varies in accordance with the magnitude of the current acting in the motor armature winding, and means for also introducing into said control circuit a second stabilizing potential which varies with the current acting in the motor field winding.

STEPHEN A. STAEGE.